(12) United States Patent
Lindsey

(10) Patent No.: US 12,095,293 B2
(45) Date of Patent: Sep. 17, 2024

(54) OVERCURRENT PROTECTION, AND ASSOCIATED CIRCUITRY, DEVICES, SYSTEMS, AND METHODS

(71) Applicant: LiveView Technologies, LLC, Orem, UT (US)

(72) Inventor: Richard C. Lindsey, Orem, UT (US)

(73) Assignee: Live View Technologies, LLC, Orem, UT (US)

( * ) Notice: Subject to any disclaimer, the term of this patent is extended or adjusted under 35 U.S.C. 154(b) by 0 days.

(21) Appl. No.: 17/936,540

(22) Filed: Sep. 29, 2022

(65) Prior Publication Data

US 2024/0113533 A1  Apr. 4, 2024

(51) Int. Cl.
*H02J 7/00* (2006.01)
*H02H 7/18* (2006.01)
*H02J 7/35* (2006.01)

(52) U.S. Cl.
CPC ........... *H02J 7/00304* (2020.01); *H02H 7/18* (2013.01); *H02J 7/0013* (2013.01); *H02J 7/0047* (2013.01); *H02J 7/0063* (2013.01); *H02J 7/007192* (2020.01); *H02J 7/35* (2013.01)

(58) Field of Classification Search
CPC .................................................. H02J 7/00304
See application file for complete search history.

(56) References Cited

U.S. PATENT DOCUMENTS

| | | | | |
|---|---|---|---|---|
| 4,390,142 A | * | 6/1983 | Cheng | B65H 75/406 242/407 |
| 5,708,350 A | * | 1/1998 | Tibbs | H01M 10/46 429/62 |
| 7,508,171 B2 | | 3/2009 | Carrier et al. | |
| 7,745,040 B2 | | 6/2010 | Chang et al. | |
| 10,103,412 B2 | | 10/2018 | Li | |
| 11,075,533 B2 | | 7/2021 | Takahashi et al. | |
| 2005/0253561 A1 | * | 11/2005 | Tibbs | H02J 7/007194 320/150 |
| 2010/0090652 A1 | | 4/2010 | Takeda et al. | |
| 2012/0092504 A1 | * | 4/2012 | Murphy | G08B 13/1963 348/E7.085 |
| 2014/0055094 A1 | * | 2/2014 | Takagi | B60L 50/51 320/126 |
| 2014/0184159 A1 | * | 7/2014 | Kachi | B60L 7/12 320/109 |
| 2017/0025843 A1 | * | 1/2017 | Liu | H02H 3/087 |

(Continued)

*Primary Examiner* — Drew A Dunn
*Assistant Examiner* — Tynese V McDaniel
(74) *Attorney, Agent, or Firm* — TraskBritt

(57) ABSTRACT

Various embodiments relate to protection circuits. A protection circuit may include a first node for coupling to a first battery and a second node for coupling to a second battery. The protection circuit may also include a first path coupled between the second node and the first node and including a diode. The protection circuit may also include a second path coupled between the first node and the second node. The second path may include a first stage coupled to the first node and including a first number of thermistors coupled in parallel. The second path may also include a second stage coupled between the first stage and the second node and including a second number of thermistors coupled in parallel, wherein the first stage may be coupled in series with the second stage. Associated methods, systems, and devices are also disclosed.

20 Claims, 8 Drawing Sheets

(56) References Cited

U.S. PATENT DOCUMENTS

| | | | |
|---|---|---|---|
| 2017/0063150 A1* | 3/2017 | Sakamoto | H02J 7/34 |
| 2018/0320835 A1* | 11/2018 | Poage | F21S 9/032 |
| 2020/0052499 A1* | 2/2020 | Takahashi | B60L 53/11 |
| 2022/0109309 A1* | 4/2022 | Liu | H02J 7/00032 |

\* cited by examiner

US 12,095,293 B2

OVERCURRENT PROTECTION, AND ASSOCIATED CIRCUITRY, DEVICES, SYSTEMS, AND METHODS

TECHNICAL FIELD

This disclosure relates generally to overcurrent protection and, more specifically, to limiting an amount of current supplied to a chargeable battery, and to related circuitry, devices, systems, and methods.

BACKGROUND

Chargeable batteries are electrical batteries that can be charged, discharged into a load, and recharged many times. Chargeable batteries, such as lithium-ion (Li-Ion) batteries, include a wide range of applications, from, for example, earbuds to large backup power systems. Some chargeable batteries (e.g., a secondary battery) may be configured to receive (e.g., from a power source, such as a primary battery) a maximum charge voltage of, for example only, 25.8 volts (V) at, for example, 3 amperes (A) or less. In some scenarios, because a chargeable battery may be coupled (e.g., directly wired) to a primary battery and because a voltage (e.g., a voltage reaching as high as 29V) exhibited by the primary battery may be greater than the maximum charge voltage, an amount of current conveyed to the chargeable battery may be too great, a charge limiter built into the chargeable battery may be overwhelmed, and the chargeable battery may be damaged.

BRIEF SUMMARY

At least one embodiment of the disclosure includes an overcurrent protection circuit. The overcurrent protection circuit may include a first node for coupling to a first battery and a second node for coupling to a second battery. The overcurrent protection circuit may also include a first path coupled between the second node and the first node and including a diode having an anode coupled to the second node and a cathode coupled to the first node. Further, the overcurrent protection circuit may include a second path coupled between the first node and the second node. The second path may include a first stage coupled to the first node and including a first number of thermistors coupled in parallel. The second path may also include a second stage coupled between the first stage and the second node and including a second number of thermistors coupled in parallel. The first stage may be coupled in series with the second stage.

Another embodiment includes a method of charging a battery. The method may include receiving, at a circuit, a first current from a primary battery. Further, the method may include, responsive to the first current, conveying, via a first path of the circuit including at least one negative temperature coefficient (NTC) thermistor coupled to at least one positive temperature coefficient (PTC) thermistor, a second current to a secondary battery.

Other embodiments may include a mobile unit. A mobile unit may include a trailer and a storage box coupled to the trailer and including a primary battery. The mobile unit may also include a mast coupled to the trailer and having a first end proximate the storage box. Further, the mobile unit may include a head unit coupled to a second, opposite end of the mast. The head unit may include a secondary battery and a protection circuit comprising a number of thermistors coupled between the primary battery and the secondary battery.

DETAILED DESCRIPTION

Figure 1:
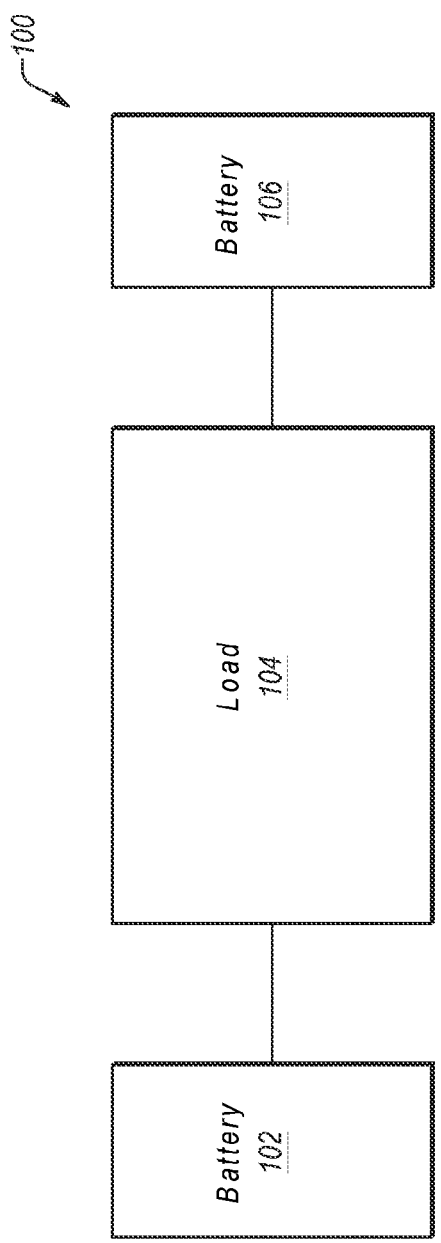
FIG. 1 depicts an example system including a primary battery and a secondary battery.

Referring in general to the accompanying drawings, various embodiments of the present invention are illustrated to show example embodiments related to overcurrent protection. It should be understood that the drawings presented are not meant to be illustrative of actual views of any particular portion of an actual circuit, device, system, or structure, but are merely representations which are employed to more clearly depict various embodiments of the disclosure.

The following provides a more detailed description of the present invention and various representative embodiments thereof. In this description, functions may be shown in block diagram form in order not to obscure the present invention in unnecessary detail. Additionally, block definitions and partitioning of logic between various blocks is exemplary of a specific implementation. It will be readily apparent to one of ordinary skill in the art that the present invention may be practiced by numerous other partitioning solutions. For the most part, details concerning timing considerations and the like have been omitted where such details are not necessary to obtain a complete understanding of the present invention and are within the abilities of persons of ordinary skill in the relevant art.

Some example systems (e.g., electronic systems) may include a primary power source (e.g., a primary battery) and a secondary power source (e.g., a secondary battery). In these example systems, the primary power source, which may be configured to provide power to a load, may include, for example, a bank of absorbed glass mat (AGM) batteries in a series/parallel combination rated at, for example only, 24V and 220 AHrs. Further, the primary power source may be configured to provide power to the secondary power source (i.e., for charging the secondary power source). The secondary power source, which may include, for example, a Li-Ion battery (e.g., a 24V Li-Ion battery), may provide power to the load upon one or more events (e.g., the primary power source failing to provide a sufficient amount of power to the load, the primary power source being disconnected from the load (e.g., if one or more wires are cut or otherwise disconnected), or another event). As noted above, in some scenarios, the secondary power source may be damaged (e.g., due to too much current being conveyed to the secondary power source). It is noted that each the primary power source and the secondary power source may include any suitable type of battery chemistry, such as, AGM, flooded lead acid, lithium (e.g., lithium-ion, lithium-polymer, lithium iron phosphate, or other lithium-based chemistry), or any combination thereof, without limitation.

Various embodiments of the disclosure relate to limiting an amount of current conveyed to a battery, while not substantially limiting an amount of current conveyed from the battery. More specifically, various embodiments relate to systems, devices, circuitry, and methods associated with limiting a current conveyed from a primary battery to a secondary battery (i.e., to charge the secondary power source), while not substantially limiting a current conveyed from the secondary battery (i.e., to power an associated load (e.g., in response to the primary battery failing to provide a sufficient amount of power to the load)).

In some embodiments, a protection circuit (also referred to herein as an "overcurrent protection circuit"), which may be coupled between the primary power source and the secondary power source, may be configured to limit an amount of current conveyed from the primary power source to the secondary power source. For example, in some embodiments, a protection circuit may include a combination of positive temperature coefficient (PTC) thermistors and negative temperature coefficient (NTC) thermistors wired in a series/parallel configuration that may limit the current over a wide ambient temperature range (e.g., from approximately −20° C. to approximately +54° C., or any other temperature range). A thermistor configuration by itself may limit both a charge current (i.e., a current conveyed to the secondary battery) and a discharge current (i.e., a current conveyed from the secondary battery). To overcome the discharge current limitation, the protection circuit may also include a diode having an anode coupled to the secondary battery and a cathode coupled to, for example, a load. In one non-limiting example, the diode may include a Schottky diode (e.g., 45V, 10 A Schottky diode), which may exhibit a low forward voltage drop of, for example, 0.5V, as opposed to 0.7V for a standard silicon diode. In some examples, even with a 0.5V drop, the secondary battery may still provide a sufficient amount of power to an associated load to operate the load for at least a time period (e.g., ½ hour, 1 hour, more than 1 hour).

Embodiments of the disclosure will now be explained with reference to the accompanying drawings.

FIG. 1 illustrates an example system 100 including a first battery 102, a load 104, and a second battery 106. In this example, first battery 102 (e.g., a primary battery) may provide power to load 104. Further, first battery 102 may provide power to second battery 106 (e.g., a backup battery) to charge second battery 106. Moreover, in response to first battery 102 failing to provide enough power to load 104, second battery 106 may provide power to load 104.

In some scenarios, because second battery 106 is coupled (e.g., directly wired) in parallel with first battery 102 and because of a voltage exhibited by first battery 102 (e.g., a voltage reaching as high as 29V), second battery 106 may be damaged due to too much current being conveyed to second battery 106.

Figure 2:
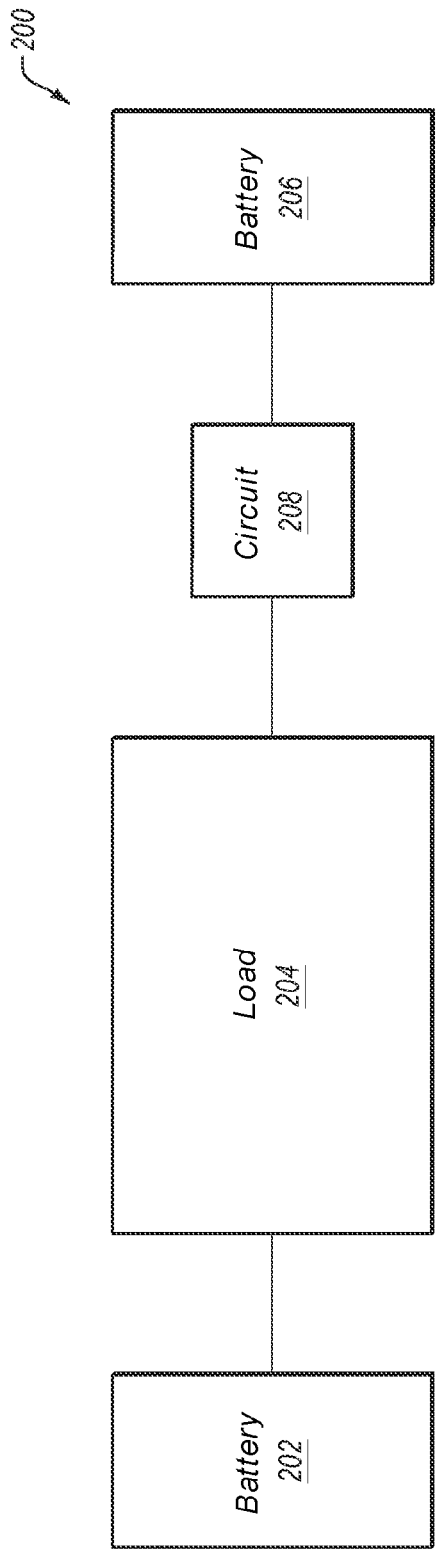
FIG. 2 illustrates an example system including a protection circuit, according to various embodiments of the disclosure.

FIG. 2 illustrates an example system 200, according to various embodiments of the disclosure. System 200 includes a first battery (also referred to as a "primary battery," a "primary power source," a "first battery," a "main battery," or some variation thereof) 202, a load 204, a second battery (also referred to as a "secondary battery," a "secondary power source," a "second battery," a "backup battery," or some variation thereof) 206, and a protection circuit 208. In this example, first battery 202 may provide power to load 204, which, in one non-limiting example, includes a control board (also referred to herein as a "control unit" or "controller") and possibly other devices (e.g., communication device, sensor, output device, without limitation). First battery 202 may receive power from any suitable source. As a non-limiting example, first battery 202 may receive power from a natural and/or a renewable power source, such as solar, wind, water, without limitation.

First battery 202 may also provide power to second battery 206 (i.e., via protection circuit 208) to charge second battery 206. Further, in response to first battery 202 failing to provide enough power to load 204, second battery 206 may provide power to load 204. In contrast to system 100 of FIG. 1, as described more fully below, protection circuit 208 may limit an amount of current conveyed to second battery 206. Further, as also described more fully below, protection circuit 208 may be configured such that an amount of current conveyed from second battery 206 to load 204 is not limited by protection circuit 208.

Figure 3:
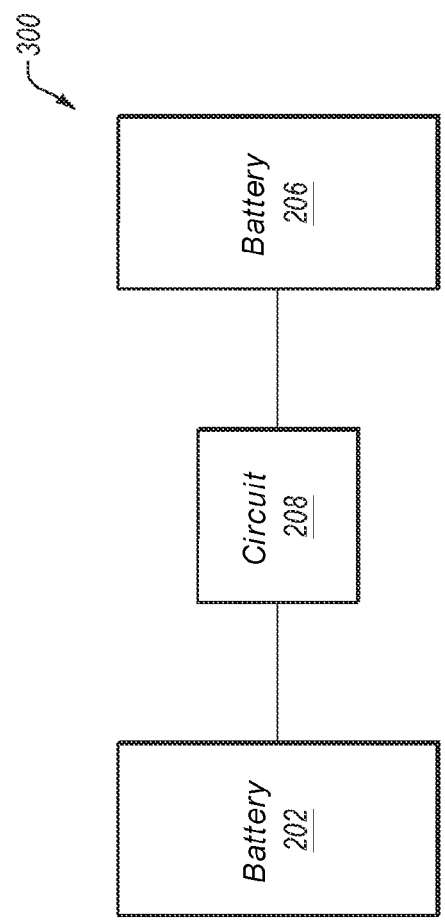
FIG. 3 illustrates another example system including a protection circuit, according to various embodiments of the disclosure.

It is noted that system 200 is provided as an example system and other system configurations are within the scope of the disclosure. For example, FIG. 3 illustrates a system 300 in accordance with various embodiments of the disclosure. Like system 200 of FIG. 2, system 300 of FIG. 3 includes protection circuit 208 coupled between first battery 202 and second battery 206; however, in system 300, a load is not coupled between first battery 202 and second battery 206. For example, second battery 206 may be coupled to a load (not shown in FIG. 3) independent of protection circuit 208.

Figure 4:
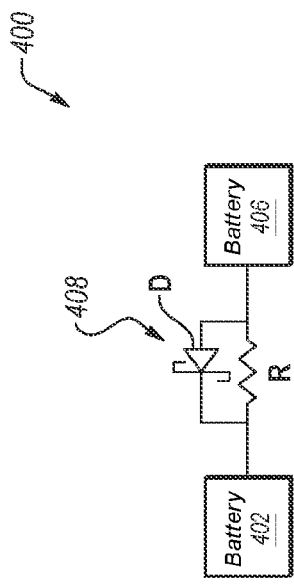
FIG. 4 depicts another example system including a protection circuit, in accordance with various embodiments of the disclosure.

FIG. 4 depicts another example system 400, according to various embodiments of the disclosure. System 400 includes a first battery 402, a second battery 406, and a protection circuit 408, which is one example of protection circuit 208 of FIG. 2 and/or FIG. 3. In this example, protection circuit 208, which is coupled between first battery 402 and second battery 406, includes a resistor R coupled in parallel with a diode D. As will be appreciated by a person having ordinary skill, a diode conducts current primarily in one direction (i.e., a diode has low (ideally zero) resistance in one direction, and high (ideally infinite) resistance in the other).

In one example wherein resistor R includes a 1.5 Ohm, 10 W resistor, and diode D includes, for example, a Schottky diode, protection circuit 408 may limit a charge current (i.e., conveyed to second battery 406) to around 4 A, while allowing a discharge current (i.e., conveyed from second battery 406) to remain at about 8 A. In another example, resistor R may include a 2 Ohm, 50 W resistor, and diode D may include an OnSemi™ Schottky diode (e.g., 45V 8 A Axial) with a forward drop of approximately 550 mV at approximately 8 A.

In one non-limiting example, a charge voltage range may be from approximately 25.2V (minimum) under normal operating conditions with first battery 402 in a "float" stage to approximately 29V (maximum) when first battery 402 is in an "absorb" stage. In this example, the maximum power dissipated by resistor R during float charging may be approximately 25 W (hence the 50 W resistor rating). Also, in some examples, it may be assumed that a voltage at second battery 406 may originally be at approximately 15V, and therefore, in this example, the maximum charge voltage requirement is approximately 14V (i.e., 29V-15V) that will be dropped across resistor R. Thus, at approximately 25 W, the maximum current through resistor R is approximately 1.78 A, and therefore, in this example, resistor R has a resistance of approximately 7.8 Ohms.

Figure 5:
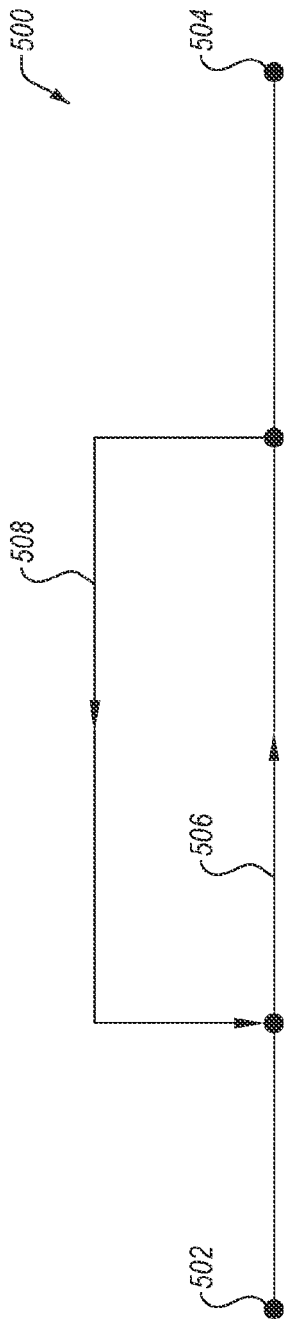
FIG. 5 depicts an example device, according to various embodiments of the disclosure.

FIG. 5 depicts an example device 500, in accordance with various embodiments of the disclosure. Device 500, which may include circuitry, includes a node (also referred to as an "input") 502, a node (also referred to as an "output") 504, a path 506, and a path 508. In some examples, node 502 may be coupled to a battery (e.g., a primary battery (e.g., first battery 202; see FIG. 2)) and node 504 may be coupled to a battery (e.g., a secondary battery (e.g., second battery 206; see FIG. 2)). For example, path 506, which may also be referred to as a "charging path," may include a number of resistive elements. More specifically, for example, path 506 may include a number of thermistors. Yet more specifically, as described more fully below, path 506 may include a plurality of thermistors in a series/parallel configuration. For example, path 508, which may also be referred to as a "discharging path," may include a diode. In another example, path 508 may include a switch (i.e., rather than a diode), which may be opened during a charge phase (i.e., while a battery coupled to node 504 is being charged) and closed during a discharge phase (i.e., while the battery coupled to node 504 is powering a load).

Figure 6:
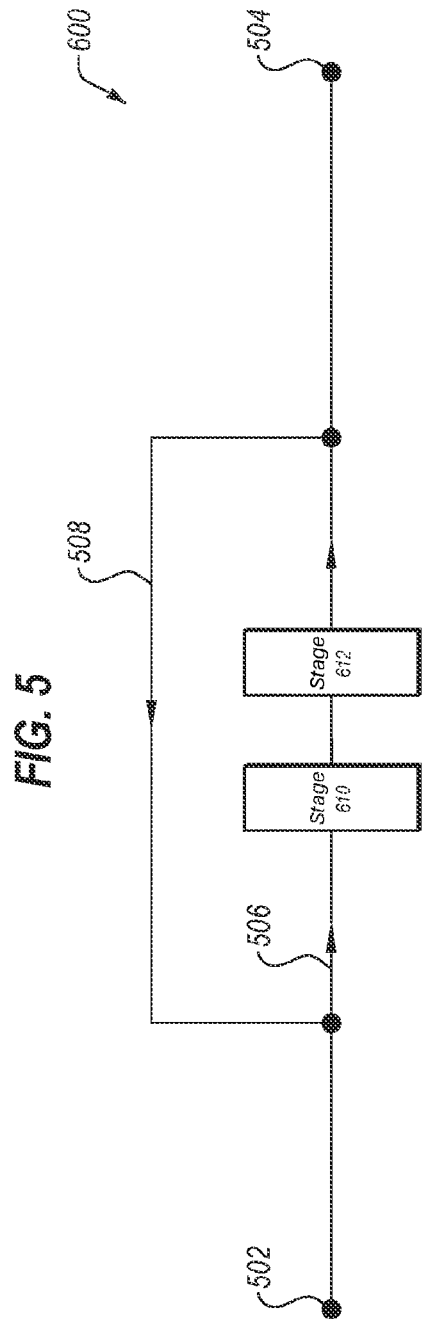
FIG. 6 depicts another example device, according to various embodiments of the disclosure.

With reference to another example device 600 of FIG. 6, according to some examples, path 506 may include a first stage 610 including a number of thermistors (e.g., one or more negative temperature coefficient (NTC) thermistors (e.g., in parallel) and/or one or more positive temperature coefficient (PTC) thermistors (e.g., in parallel)) and a second stage 612 including a number of thermistors (e.g., one or more negative temperature coefficient (NTC) thermistors (e.g., in parallel) and/or one or more positive temperature coefficient (PTC) thermistors (e.g., in parallel)). As will be appreciated by a person having ordinary skill in the art, PTC and NTC thermistors are temperature-dependent resistors, wherein a resistance of a PTC thermistor increases with an increasing temperature and decreases with a decreasing temperature, and a resistance of a NTC thermistor decreases with an increasing temperature and increases with a decreasing temperature. Although various embodiments described herein use and/or include thermistors, the disclosure is not so limited and other suitable temperature dependent resistance devices may be used in addition to or in place of one or more thermistors.

Figure 7:
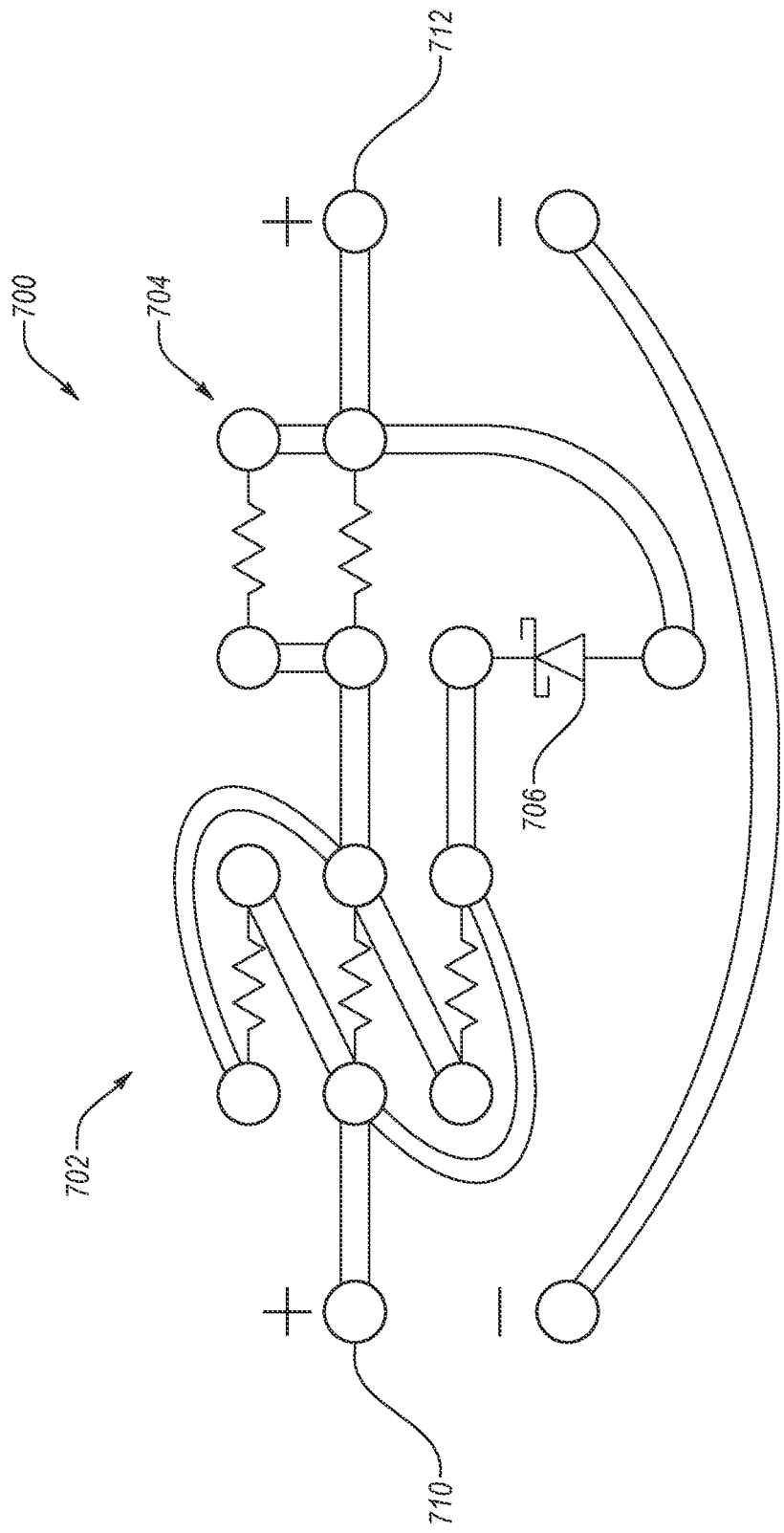
FIG. 7 depicts an example layout, in accordance with various embodiments of the disclosure.

FIG. 7 depicts an example layout 700, according to various embodiments of the disclosure. Layout 700, which may include a top view of a printed circuit board (PCB) layout, depicts a number of (i.e., three in this non-limiting example) PTC thermistors 702 coupled in parallel, a number of (i.e., two in this non-limiting example) NTC thermistors 704 coupled in parallel, and a diode 706. Layout 700 further depicts a node (e.g., input node) 710 for coupling to a load and/or a primary battery, and a node 712 for coupling to a secondary battery (i.e., a chargeable battery).

Figure 8:
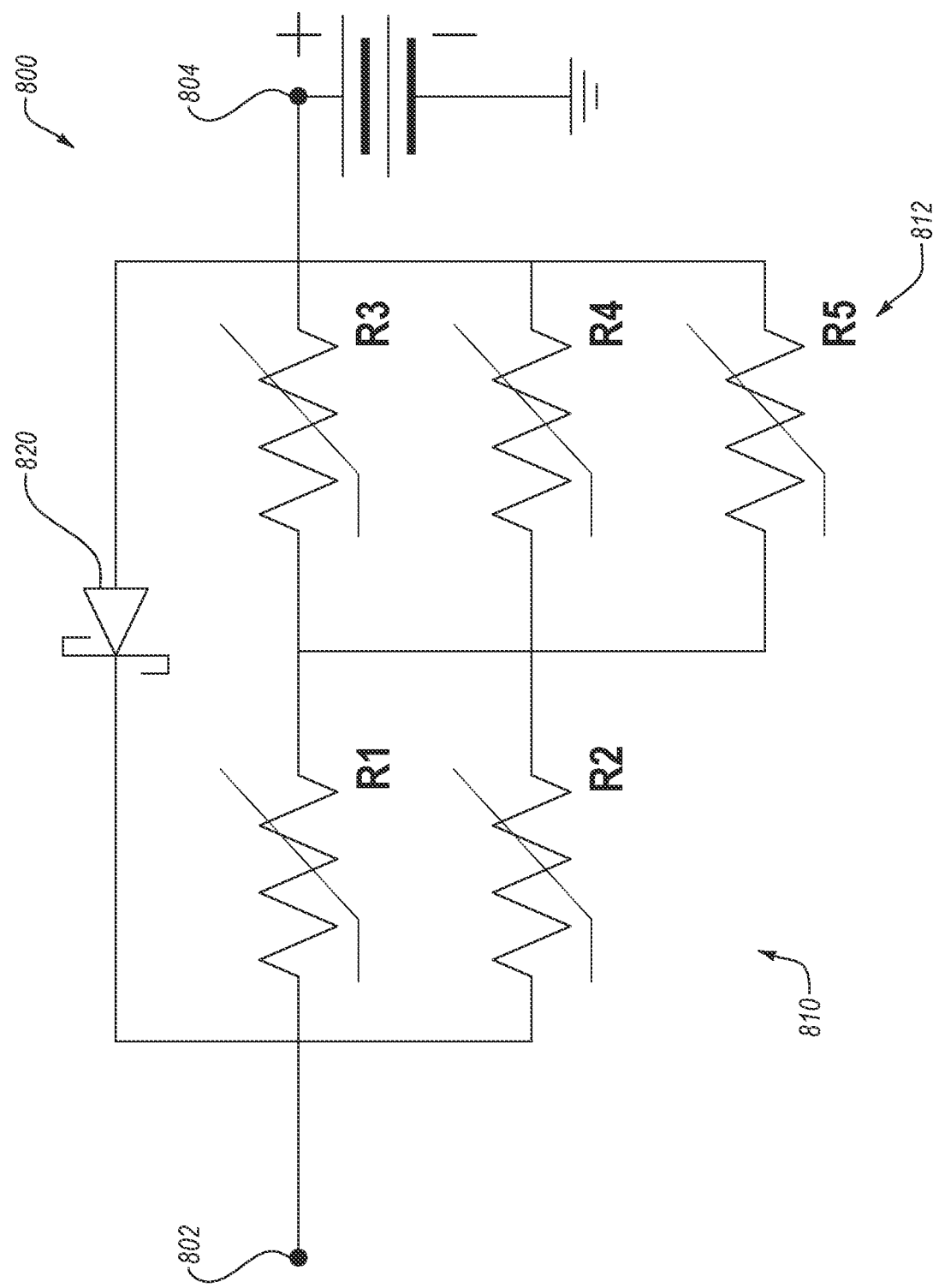
FIG. 8 depicts an example circuit, according to various embodiments of the disclosure.

FIG. 8 illustrates an example circuit 800, according to various embodiments of the disclosure. For example, protection circuit 208 (see e.g., FIG. 2 and/or FIG. 3) may include circuit 800. Circuit 800 includes a first stage 810 including a first thermistor R1 and a second thermistor R2. In some examples, each of thermistor R1 and thermistor R2 includes an NTC thermistor. In other examples, each of thermistor R1 and thermistor R2 includes a PTC thermistor.

Circuit 800 further includes a second stage 812 including a third thermistor R3, a fourth thermistor R4, and a fifth thermistor R5. In some examples, each of thermistor R3, thermistor R4, and thermistor R5 includes a PTC thermistor. In other examples, each of thermistor R3, thermistor R4, and thermistor R5 includes an NTC thermistor.

It is noted that although first stage 810 is illustrated as having two thermistors, the disclosure is not so limited, and first stage 810 may include any suitable number of thermistors. Similarly, it is noted that although second stage 812 is illustrated as having three thermistors, the disclosure is not so limited, and second stage 812 may include any suitable number of thermistors. Circuit 800 further includes a diode 820 coupled between a node (also referred to herein as an "input") 802 and a node (also referred to therein as an "output") 804.

As will be appreciated, during a charging phase (i.e., while a battery coupled to node 804 is charged), a current may flow through first stage 810 and second stage 812, and current will not flow from node 802 to node 804 via diode 820 (i.e., because diode may not allow current in the reverse direction). Further, during a discharging phase (i.e., while a battery coupled to node 804 provides power to a load), a current may flow from node 804 to node 802 via diode 820, and little, if any, current will flow from node 804 to node 802 via second stage 812 and first stage 810. In other words, in at least some examples, during the charging phase, all current conveyed from node 802 to node 804 flows through the thermistor network of first stage 810 and second stage 812, and during the discharging phase, all current conveyed from node 804 to node 802 flows through diode 820. Therefore, during the discharging phase, a current conveyed from node 804 to node 802 may not be limited by the thermistor network of first stage 810 and second stage 812.

Each thermistor of circuit 800 may include any suitable default resistance. As a non-limiting example, each of thermistor R1 and thermistor R2, which in one specific example includes an NTC thermistor, may include a default resistance of approximately 7.0 ohms (e.g., at room temperature). Further, as a non-limiting example, each of thermistor R3, thermistor R4, and thermistor R5, which in one specific example includes a PTC thermistor, may include a default resistance of approximately 3.0 ohms (e.g., at room temperature). Diode 820 may include any diode, such as a silicon diode, a Schottky diode (e.g., 10 A Schottky diode), or any other suitable diode.

In one non-limiting contemplated operation, node 802 may receive an input voltage in the range of approximately 22.6 volts to approximately 29 volts. Further, in this non-limiting contemplated operation, circuit 800 may generate an output voltage in the range of approximately 15 volts to approximately 25.6 volts.

Although thermistors R1 and R2 are described as having the same default resistance value and thermistors R3, R4, and R5 are described as having the same default resistance value, the disclosure is not so limited. Rather, each of thermistor R1, R2, R3, R4, and R5 may have any default resistance value that may or may not be the same as or similar to a resistance value of another thermistor of circuit 800. Moreover, although thermistors in a stage (e.g., stage 810 or stage 812) are described as being the same type of thermistor (i.e., either PTC or NTC thermistors), the disclosure is not so limited. Rather, each of thermistor R1, R2, R3, R4, and R5 may be any type of thermistor (i.e., PTC or NTC) regardless of a type of another thermistor of circuit 800.

As will be appreciated by a person having ordinary skill in the art, circuit 800 may limit the current over a wide ambient temperature range. More specifically, for example, at some temperatures (e.g., at or around −12° C.) a resistance of one or more NTC thermistors of a circuit (e.g., circuit 800) may significantly increase to limit an amount of current conveyed to an output (e.g., output node 804). Further, for example, at some temperatures (e.g., at or around +40° C.) a resistance of one or more PTC thermistors of a circuit (e.g., circuit 800) may significantly increase to limit an amount of current conveyed to an output (e.g., output node 804). In one specific example configuration, circuit 800 may limit the current over a wide ambient temperature range from approximately −20° ° C. to approximately +54° ° C. However, it will be appreciated that by, for example, varying the configuration and/or the size of one or more thermistors of circuit 800, other temperature ranges may fall within the scope of the disclosure.

Figure 9:
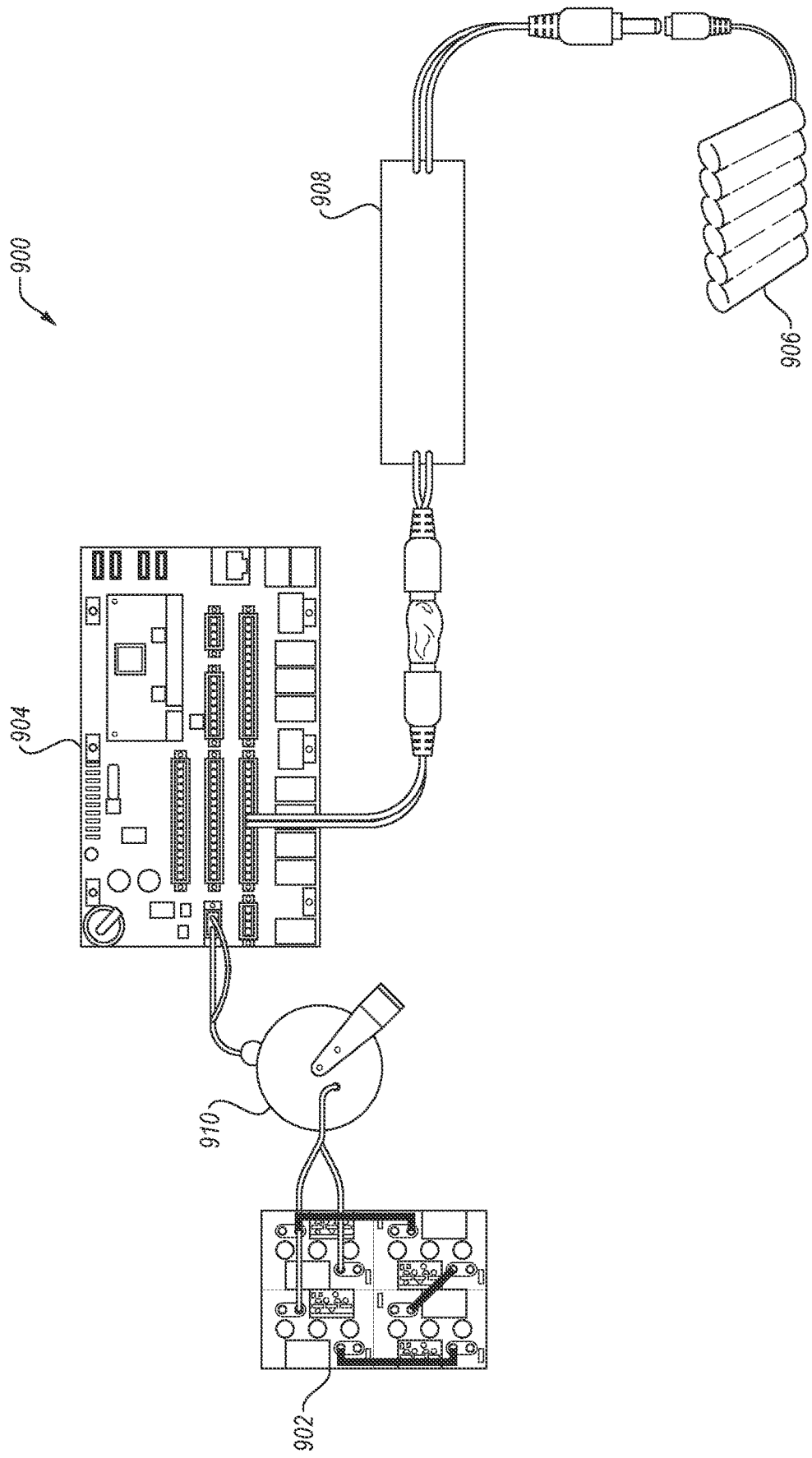
FIG. 9 illustrates yet another example system including a protection circuit, according to one or more embodiments of the disclosure.

FIG. 9 depicts another example system 900, in accordance with various embodiments of the disclosure. System 900 includes a primary battery 902, a load 904, a secondary battery 906, a protection circuit 908, and a cord reel 910. As non-limiting examples, primary battery 902 may include a bank of absorbed glass mat (AGM) batteries, secondary battery 906 may include a Li-Ion battery, and load 904 may include a control board, and possibly other electrical devices. Protection circuit may include protection circuit 208 (see e.g., FIG. 2 and/or FIG. 3) and/or circuit 800 of FIG. 8.

Figure 10:
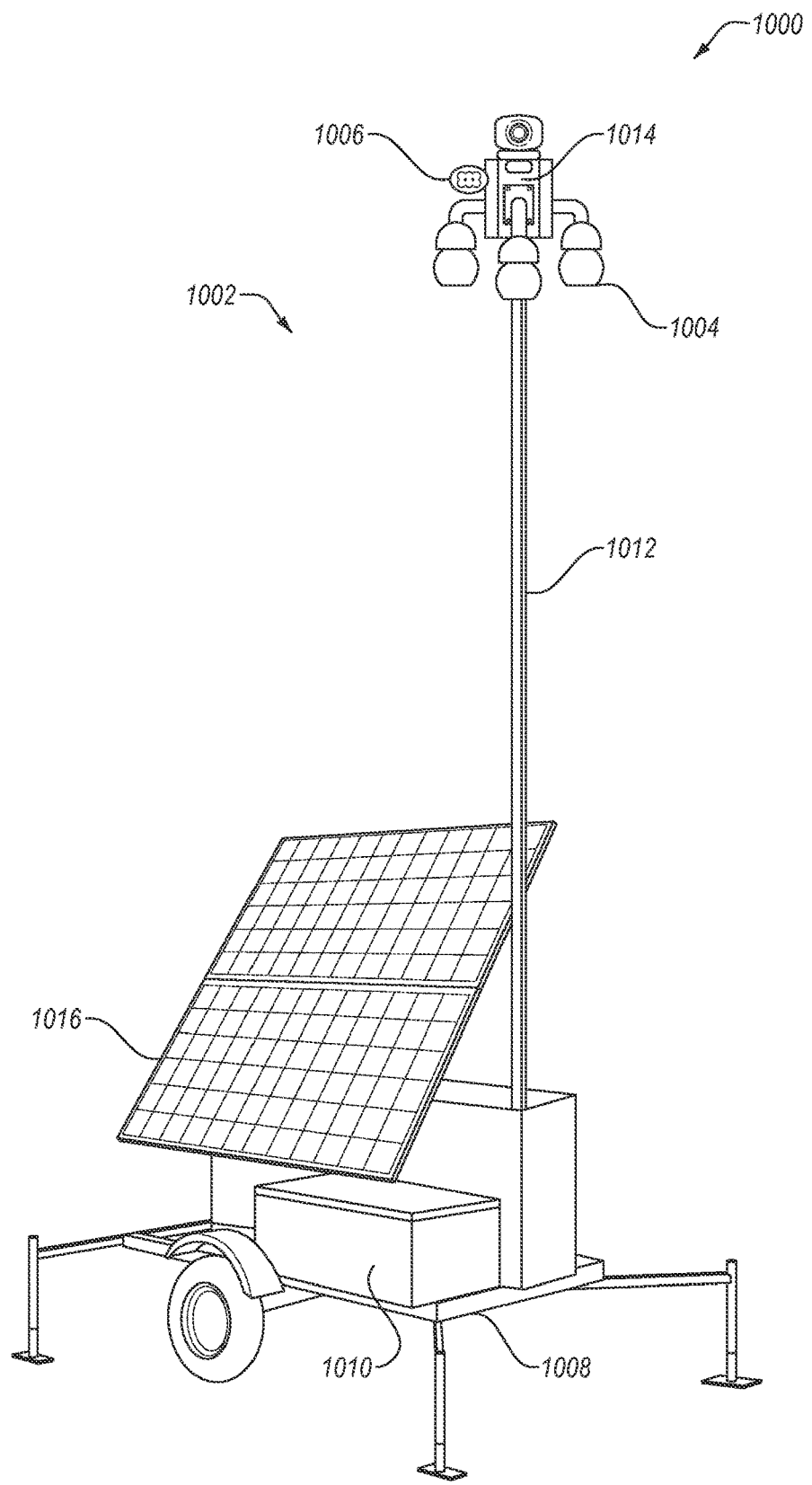
FIG. 10 depicts an example system including a mobile unit, in accordance with various embodiments of the disclosure.

FIG. 10 depicts another example system 1000 including a unit 1002, in accordance with various embodiments of the disclosure. Unit 1002, which may also be referred to herein as a "mobile unit," a "mobile security unit," a "live unit," a "physical unit," or simply a "unit," may include one or more sensors (e.g., cameras, weather sensors, motion sensors, noise sensors, without limitation) 1004 and one or more output devices 1006 (e.g., lights, speakers, electronic displays, without limitation).

In some embodiments, unit 1002 may include a mobile unit, which may or may not be used for security and/or surveillance. In these and other embodiments, unit 1002 may include a portable trailer 1008, a storage box 1010, and a mast 1012 coupled to a head unit 1014, which may include for example, one or more batteries, one or more cameras, one or more lights, one or more speakers, and/or one or more microphones. According to some embodiments, a first end of mast 1012 may be proximate storage box 1010 and a second, opposite end of mast 1012 may be proximate, and possibly adjacent, head unit 1014. More specifically, in some embodiments, head unit 1014 may be coupled to mast 1012 an end opposite an end of mast 1012 proximate storage box 1010.

In some examples, unit 1002 may include one or more primary batteries (e.g., within storage box 1010) and one or more secondary batteries (e.g., within head unit 1014). In these embodiments, a primary battery positioned in storage box 1010 may be coupled to a load and/or a secondary battery positioned within head unit 1014 via a cord reel, such as cord reel 910 of FIG. 9.

In some embodiments, unit 1002 may also include one or more solar panels 1016, which may provide power to one or more batteries of unit 1002. More specifically, according to some embodiments, one or more solar panels 1016 may provide power to a primary battery within storage box 1010. Although not illustrated in FIG. 10, unit 1002 may also include one or more additional power sources, such as one or more generators (e.g., fuel cell generators). In some embodiments, a primary power source may include a battery charger that is configured to be plugged into, for example, a shore power (e.g., 100 VAC) electrical outlet.

As noted above, in the event that a primary battery (e.g., primary battery 902 of FIG. 9) fails to provide sufficient power to a load (e.g., load 904 of FIG. 9), a secondary battery (e.g., secondary battery 906 of FIG. 9) may take over (i.e., provide power to the load). As a non-limiting example, secondary battery 906 may provide enough power (e.g., to load 904 and/or other devices) to continue to operate unit 1002 for an amount of time (e.g., ½ hour, 1 hour, without limitation) (e.g., such that pertinent data can be collected by unit 1002 regarding the reason for the failure of primary battery 902).

Figure 11:
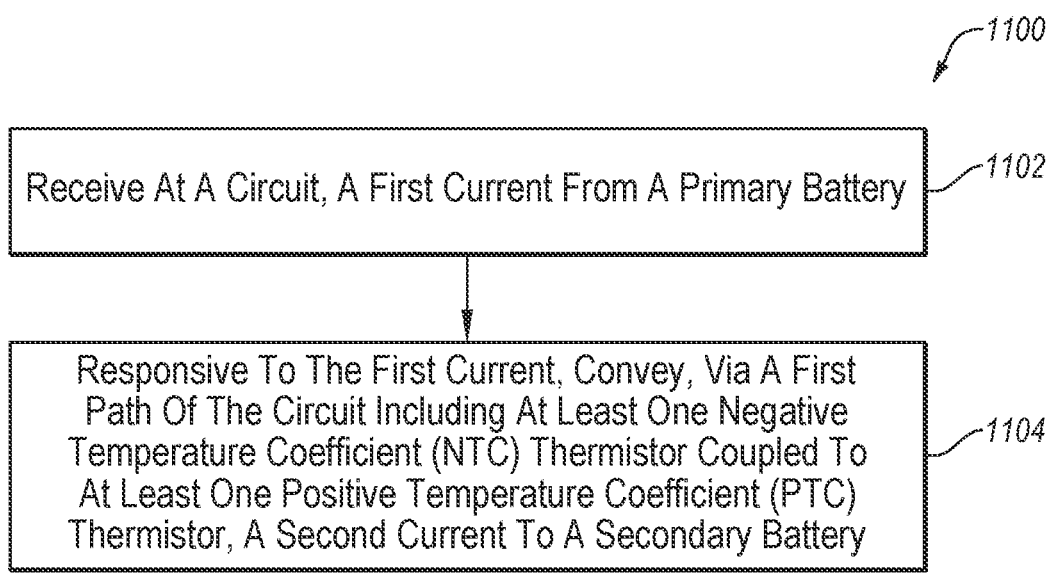
FIG. 11 is a flowchart illustrating an example method of charging a battery, according to various embodiments of the disclosure.

FIG. 11 is a flowchart of an example method 1100 of charging a battery. Method 1100 may be arranged in accordance with at least one embodiment described in the disclosure. Method 1100 may be performed, in some embodiments, by a device or system, such as system 200 (see FIG. 2), system 300 (see FIG. 3), system 400 (see FIG. 4), device 500 (see FIG. 5), device 600 (see FIG. 6), layout 700 (see FIG. 7), circuit 800 (see FIG. 8), system 900 (see FIG. 9), unit 1002 (see FIG. 10), or another device or system. Although illustrated as discrete blocks, various blocks may be divided into additional blocks, combined into fewer blocks, or eliminated, depending on the desired implementation.

Method 1100 may begin at block 1102, wherein a first current is supplied from a first battery to a protection circuit, and method 1100 may proceed to block 1104. For example, the first battery may include a primary battery of a system (e.g., battery 202 (see FIG. 2 and/or FIG. 3) and/or battery 902 (see FIG. 9)). Further, for example, the first battery, which may include a bank of AGM batteries, may be positioned in a storage box (e.g., storage box 1010 of FIG. 10) of a mobile unit (e.g., unit 1002 of FIG. 10). For example, the protection circuit may include protection circuit 208 (see FIG. 2 and/or FIG. 3), protection circuit 800 (see FIG. 8) and/or protection circuit 908 (see FIG. 9).

At block 1104, responsive to the first current, a second current may be conveyed to a second battery via a path of the protection circuit (i.e., to charge the second battery). In at least some examples, the path of the protection circuit (e.g., charging path 506 (see FIG. 5 and/or FIG. 6)) may include at least one positive temperature coefficient (PTC) thermistor coupled to at least one negative temperature coefficient (NTC) thermistor. As noted above, the protection circuit may include protection circuit 208 (see FIG. 2 and/or FIG. 3), protection circuit 800 (see FIG. 8) and/or protection circuit 908 (see FIG. 9). For example, the second battery may include a secondary battery of a system (e.g., battery 206 (see FIG. 2 and/or FIG. 3) and/or battery 906 (see FIG. 9)). Further, for example, the second battery, which may include a Li-Ion battery, may be positioned in a head unit (e.g., head unit 1014 of FIG. 10) of a mobile unit (e.g., unit 1002 of FIG. 10). As will be appreciated, the second current (i.e., the current conveyed to the second battery) may be less than the first current conveyed from the first battery to the protection circuit.

Modifications, additions, or omissions may be made to method 1100 without departing from the scope of the present disclosure. For example, the operations of method 1100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment. For example, method 1100 may include one or more acts wherein a current is conveyed from the secondary battery to a load via another path of the protection circuit that may include a diode. For example, the current conveyed from the second battery to the load may be greater than the current conveyed to the second battery (i.e., from the first battery and via the protection circuit). As another example, method 1100 may include one or more acts wherein the primary battery is charged via energy received from a renewable source (e.g., a solar panel or a fuel cell), shore power, or other energy source.

As will be appreciated by persons having ordinary skill in the art, in contrast to conventional systems, devices, circuitry, and methods, which require complex and costly circuitry using active components (e.g., A/D converters, comparator circuitry, uProcessors, FETs, etc.) to monitor the voltage and current (i.e., for providing overcurrent protection), various embodiments disclosed herein provide overcurrent protection via inexpensive passive components (e.g., one or more thermistors and possibly a diode), which may be more robust than active circuit components.

As will be appreciated, temperature differences of a system may affect optimal and dangerous charging currents. Lithium batteries may be particularly sensitive to certain charging currents (e.g., when the Lithium battery is too cold or too warm). It is noted that, due to the various charge current profiles of all batteries, and especially Lithium chemistries, the thermal dynamic nature of various disclosed embodiments may adjust the charging currents based on temperature. Accordingly, various embodiments may exhibit improvements (e.g., in safety and/or functionality) over existing technologies.

In accordance with common practice, the various features illustrated in the drawings may not be drawn to scale. The illustrations presented in the disclosure are not meant to be actual views of any particular apparatus (e.g., circuit, device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., circuit, device, or system) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. As used herein, "and/or" includes any and all combinations of one or more of the associated listed items.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

As used herein, the term "substantially" in reference to a given parameter, property, or condition means and includes to a degree that one of ordinary skill in the art would understand that the given parameter, property, or condition is met with a degree of variance, such as within acceptable tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms "first," "second," "third," etc., connote a specific number of elements, these terms should not be understood to connote a specific number of elements.

The embodiments of the disclosure described above and illustrated in the accompanying drawings do not limit the scope of the disclosure, which is encompassed by the scope of the appended claims and their legal equivalents. Any equivalent embodiments are within the scope of this disclosure. Indeed, various modifications of the disclosure, in addition to those shown and described herein, such as alternative useful combinations of the elements described, will become apparent to those skilled in the art from the description. Such modifications and embodiments also fall within the scope of the appended claims and equivalents.

What is claimed:

1. An overcurrent protection circuit, comprising:
   a first node for coupling to a first battery;
   a second node for coupling to a second battery; and
   only two paths between the first node and the second node, the two paths consisting of:
   a first path coupled between the second node and the first node and configured for conveying a first current from the second node to the first node, the first path including a diode having an anode coupled to the second node and a cathode coupled to the first node; and
a second path coupled between the first node and the second node and configured for conveying a second current from the first node to the second node, the second path including:
a first stage coupled to the first node and including a first number of thermistors coupled in parallel; and
a second stage coupled between the first stage and the second node and including a second number of thermistors coupled in parallel, the first stage coupled in series with the second stage;
wherein the overcurrent protection circuit is configured to limit an amount of the second current continuously while the second current is conveyed from the first node to the second node over a temperature range of approximately −20° C. to approximately +54° C.

2. The overcurrent protection circuit of claim 1, wherein:
the first number of thermistors comprises two negative temperature coefficient (NTC) thermistors coupled in parallel; and
the second number of thermistors comprises three positive temperature coefficient (PTC) thermistors coupled in parallel.

3. The overcurrent protection circuit of claim 1, wherein the diode comprises a Schottky diode.

4. The overcurrent protection circuit of claim 1, wherein:
the first number of thermistors comprises a plurality of positive temperature coefficient (PTC) thermistors coupled in parallel; and
the second number of thermistors comprises a plurality of negative temperature coefficient (NTC) thermistors coupled in parallel.

5. The overcurrent protection circuit of claim 1, wherein:
the first number of thermistors comprises a plurality of negative temperature coefficient (NTC) thermistors coupled in parallel; and
the second number of thermistors comprises a plurality of positive temperature coefficient (PTC) thermistors coupled in parallel.

6. The overcurrent protection circuit of claim 1, wherein an amount of current conveyed from the first node to the second node during a charging phase is less than an amount of current conveyed from the second node to the first node during a discharging phase.

7. The overcurrent protection circuit of claim 1, wherein the first node is for receiving the first current from the first battery.

8. A method of charging a battery, the method comprising:
receiving, at a node of circuit, a first current from a primary battery, the node electrically coupled to a load, the load electrically coupled between the primary battery and the node;
responsive to the first current, conveying, from the node and via a first path of the circuit including at least one negative temperature coefficient (NTC) thermistor coupled to at least one positive temperature coefficient (PTC) thermistor, a second current to a secondary battery, wherein an amount of the second current is limited continuously while the second current is conveyed to the second battery over a temperature range of approximately −20° C. to approximately +54° C.; and
conveying, via a second path of the circuit including a diode, a third current from the secondary battery to the node;
wherein the circuit includes only two paths between the node and the secondary battery, the two paths consisting of the first path and the second path.

9. The method of claim 8, wherein conveying the third current from the secondary battery to the load comprises conveying the third current from the secondary battery to the load responsive to the primary battery failing to provide sufficient power to the load.

10. The method of claim 8, wherein conveying the second current via the first path comprises conveying the second current via a first stage of the first path comprising the at least one NTC thermistor and a second stage of the first path comprising the at least one PTC thermistor.

11. The method of claim 8, further comprising charging the primary battery via energy received from a solar panel.

12. A mobile unit, comprising:
a trailer;
a storage box coupled to the trailer and including a primary battery;
a mast coupled to the trailer and having a first end proximate the storage box; and
a head unit coupled to a second, opposite end of the mast, the head unit comprising:
a secondary battery; and
a protection circuit comprising a number of thermistors electrically coupled between the primary battery and the secondary battery, the protection circuit, comprising:
a first node for electrically coupling to the primary battery via a load, the load electrically coupled between the primary battery and the first node;
a second node for electrically coupling to the secondary battery; and
only two paths between the first node and the second node, the two paths consisting of:
a first path coupled between the second node and the first node and configured for conveying a first current from the second node to the first node, the first path including a diode; and
a second path coupled between the first node and the second node and configured for conveying a second current from the first node to the second node, the second path including:
a first stage coupled to the first node and including a first number of thermistors coupled in parallel; and
a second stage coupled between the first stage and the second node and including a second number of thermistors coupled in parallel, the first stage coupled in series with the second stage;
wherein an amount of the second current is limited continuously while the second current is conveyed from the first node to the second node over a temperature range of approximately −20° C. to approximately +54° C.

13. The mobile unit of claim 12, wherein the load is electrically coupled between the primary battery and the protection circuit.

14. The mobile unit of claim 12, wherein the head unit further comprises one or more output devices, one or more sensors, or any combination thereof.

15. The mobile unit of claim 14, wherein:
the one or more sensors comprise a noise sensor, a camera, a motion sensor, a temperature sensor, a weather sensor, or any combination thereof; and the one or more output devices comprise one or more lights, one or more speakers, or any combination thereof.

16. The mobile unit of claim 12, wherein at least one of the primary battery or the secondary battery comprises one or more of an absorbed glass mat (AGM) battery, a flooded lead acid battery, or a Lithium battery.

17. The mobile unit of claim 16, further comprising one or more solar panels for providing energy to the primary battery.

18. The mobile unit of claim 12, further comprising a cord reel coupled between the primary battery and the secondary battery.

19. The mobile unit of claim 12, wherein the load is electrically coupled between the primary battery and the protection circuit.

20. The mobile unit of claim 19, wherein the protection circuit is further coupled to the secondary battery.

* * * * *

UNITED STATES PATENT AND TRADEMARK OFFICE
CERTIFICATE OF CORRECTION

PATENT NO. : 12,095,293 B2
APPLICATION NO. : 17/936540
DATED : September 17, 2024
INVENTOR(S) : Richard C. Lindsey It is certified that error appears in the above-identified patent and that said Letters Patent is hereby corrected as shown below:

On the Title Page

In ITEM (73) Assignee: change "Live View Technologies, LLC, Orem, UT (US)" to --LiveView Technologies, LLC, Orem, UT (US)--

In the Specification

| | | |
|---|---|---|
| Column 2, | Line 67, | change "and 220 AHrs." to --and 220AHrs.-- |
| Column 3, | Line 49, | change "45V, 10 A Schottky" to --45V, 10A Schottky-- |
| Column 4, | Lines 55-56, | change "1.5 Ohm, 10 W resistor," to --1.5 Ohm, 10W resistor,-- |
| Column 4, | Line 58, | change "around 4 A, while" to --around 4A, while-- |
| Column 4, | Line 60, | change "about 8 A. In" to --about 8A. In-- |
| Column 4, | Line 61, | change "2 Ohm, 50 W resistor," to --2 Ohm, 50W resistor,-- |
| Column 4, | Lines 62-63, | change "(e.g., 45V 8 A Axial)" to --(e.g., 45V 8A Axial)-- |
| Column 4, | Line 63, | change "approximately 550 mV at" to --approximately 550mV at-- |
| Column 4, | Line 64, | change "approximately 8 A." to --approximately 8A.-- |
| Column 5, | Line 4, | change "approximately 25 W (hence" to --approximately 25W (hence-- |
| Column 5, | Line 4, | change "the 50 W resistor" to --the 50W resistor-- |
| Column 5, | Lines 9-10, | change "approximately 25 W, the |

Signed and Sealed this
Twelfth Day of November, 2024

Katherine Kelly Vidal
*Director of the United States Patent and Trademark Office*

|  |  |  |
|---|---|---|
|  |  | maximum" to --approximately 25W, the maximum-- |
| Column 5, | Lines 10-11, | change "approximately 1.78 A, and" to --approximately 1.78A, and-- |
| Column 6, | Line 50, | change "(e.g., 10 A Schottky" to --(e.g., 10A Schottky-- |
| Column 7, | Line 17, | change "approximately -20° ° C. to" to --approximately -20° C. to-- |
| Column 7, | Lines 17-18, | change "approximately +54° ° C. However," to --approximately +54° C. However,-- |
| Column 8, | Line 5, | change "(e.g., 100 VAC) electrical" to --(e.g., 100VAC) electrical-- |

In the Claims

| Claims Heading, | Column 10, | Line 59, | change "What is claimed:" to --What is claimed is:-- |